United States Patent Office 3,334,859
Patented Aug. 8, 1967

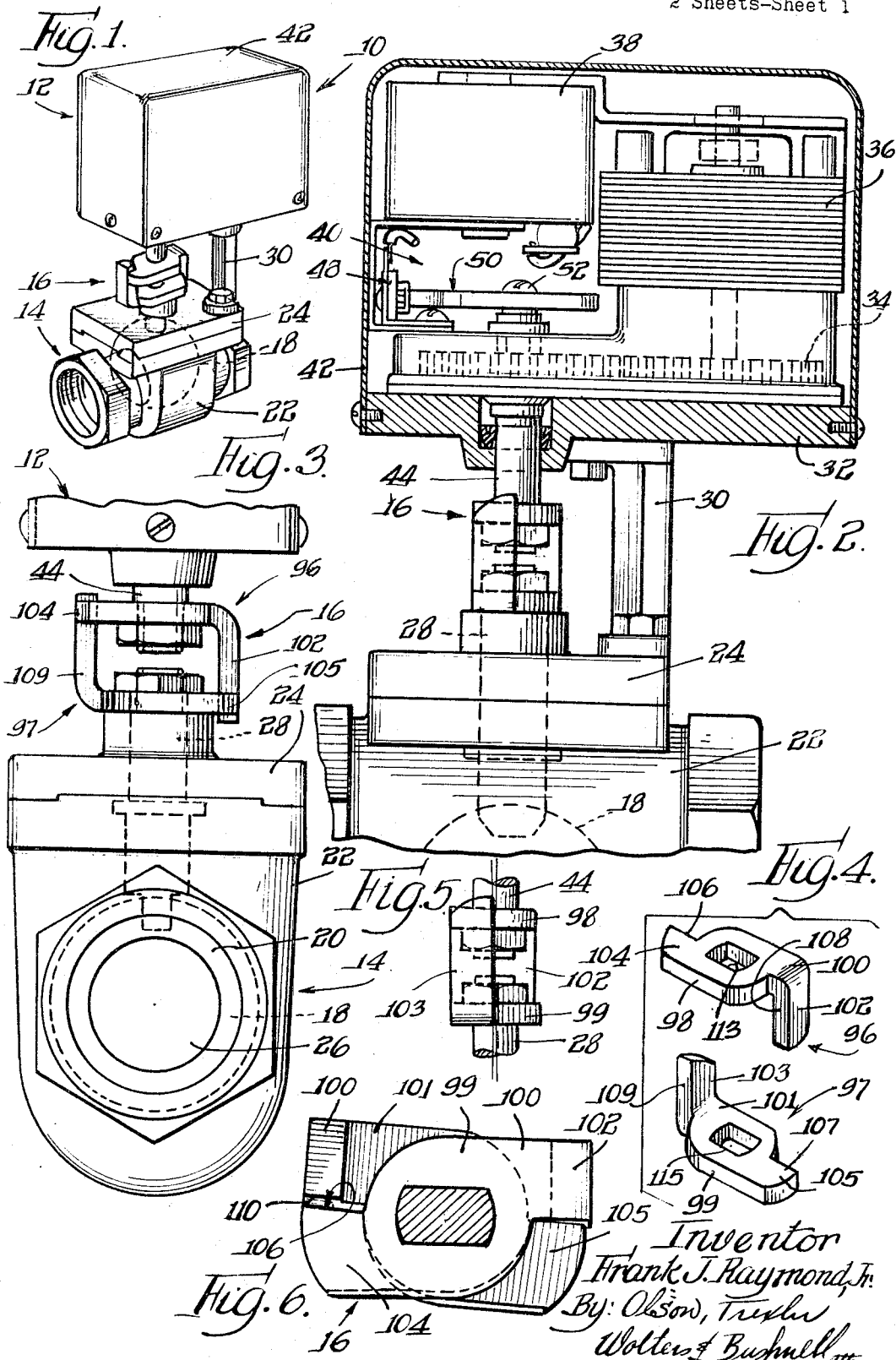

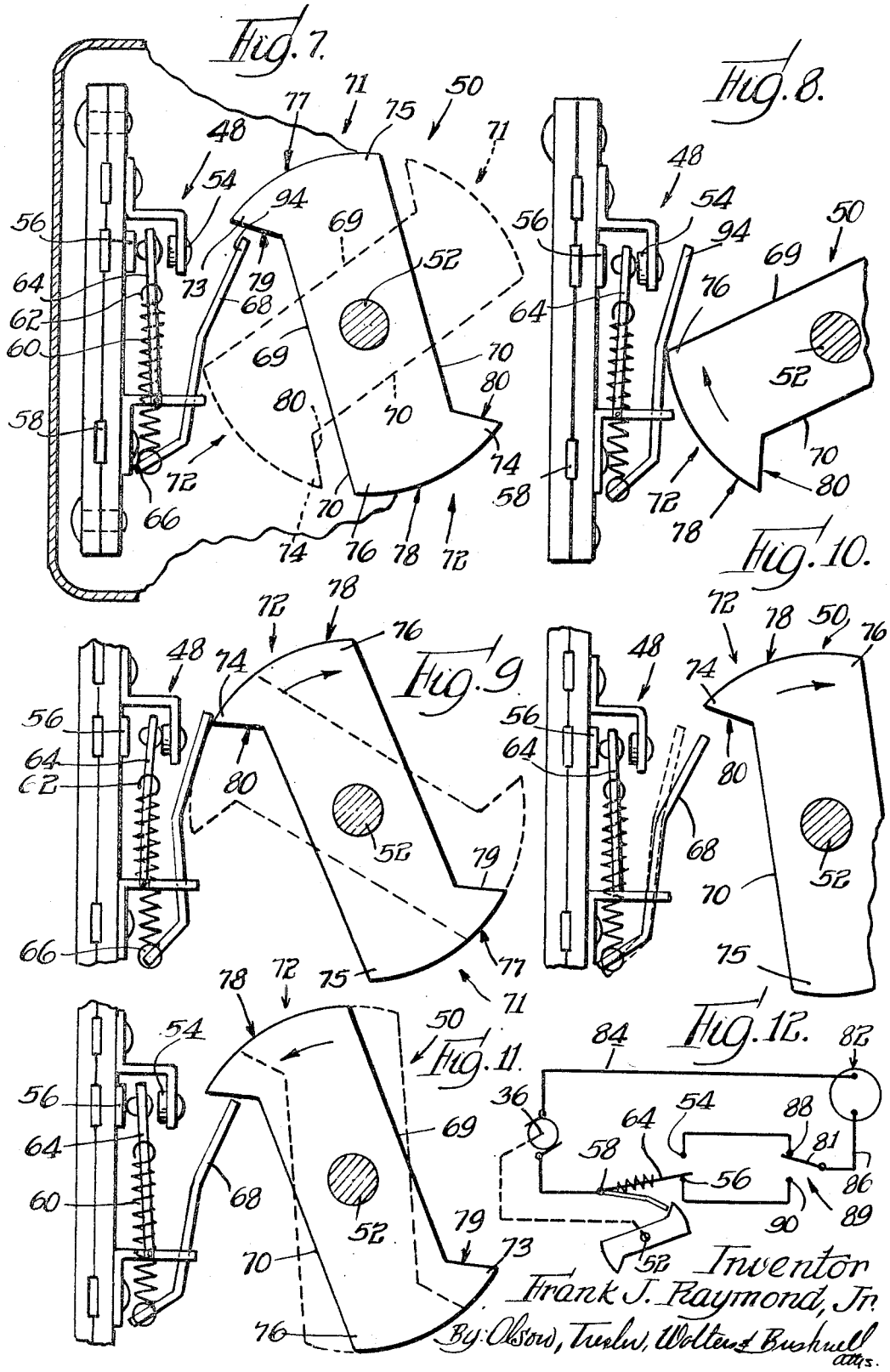

3,334,859
VALVE ACTUATOR
Frank J. Raymond, Jr., Barrington Hills, Ill., assignor to Ramcon Corporation, Sterling, Ill., a corporation of Illinois
Filed Oct. 22, 1964, Ser. No. 405,751
13 Claims. (Cl. 251—134)

The present invention relates to valves operated by power and more particularly to electrically powered ball valve assemblies.

A ball valve comprises in general a flow control ball disposed between two valve seats which encircle inlet and outlet passages into the valve and fit snugly against the ball. To open or close the valve, the ball is rotated through one-quarter turn to swing a centrally disposed bore in the ball into or out of alignment with the valve seats to permit or to stop a flow of fluids through the valve. Considerable torque can be required to rotate the ball to overcome its resistance to rotation between its seats and hence some prior art ball valve assemblies have been electrically powered to provide the torque required.

Various problems are encountered with electrically powered ball valve assemblies with respect to rotating the ball precisely one-quarter revolution to assure a maximum valve opening or a complete valve closing. These problems derive from difficulties involved in positioning the electrically powered drive unit portion of the assemblies to secure its exact alignment with a rotatable stem of the ball and from difficulties involved in making or breaking electrical contacts instantaneously at the exact position required for stopping rotation of the ball.

In prior art electrically powered ball valve assemblies, a rotary output shaft of the electrical power drive unit was connected to a rotatable ball stem for rotation of the ball. Where the drive unit was not mounted in precisely the correct position with respect to the ball and ball valve housing, the output shaft and the ball stem were misaligned and the ball would not open or close completely as required.

An electrical switch actuator was utilized to make or break electrical contacts and stop or start movement of the drive unit output shaft. Frequently electrical contacts would be maintained too long and the ball was rotated past the maximum open or closed position. In other instances rotational spring-back of the output shaft resulted in chatter or hunt of the switch actuator and consequent vibration and excessive rotation of the ball.

Thus, it is a general object of the present invention to provide an improved electrically powered ball valve assembly.

It is another object of the invention to provide an electrically powered ball valve assembly wherein the problems occasioned by misalignment between the output shaft and the ball stem are effectively eliminated and where the ball is rotated through exactly the same angle of rotation as the output shaft despite angularity between the output shaft and the ball stem.

Still another object of the invention is to provide means in an electrically powered ball valve assembly for terminating opening and closing movements of the valve ball in precisely the position desired.

Yet another object of the invention is to provide an improved and simplified electrically powered ball valve assembly that is exceptionally responsive in rotating the ball to open and close the valve without vibration or noise.

A further object is to provide an improved electrically powered ball valve assembly having means for manually rotating the ball to open or close the valve in the event of a power failure.

The structure in accordance with the invention includes an electrical power unit mounted over a ball valve housing and having a driven output shaft connected to a rotatable ball stem for rotation of the ball. Novel torque transfer means is provided connecting the ball stem and the output shaft for insuring their synchronous movement in a smooth flowing manner without chattering or vibration despite a misalignment of the ball stem and the output shaft. The power unit includes an improved switch assembly having switch actuation means for deenergizing the power unit and stopping rotation of the ball in precisely the position desired, that is, with the valve fully open or fully closed.

The invention, both as to its structure and mode of operation, will be better understood by reference to the following disclosure and drawings forming a part thereof, wherein:

FIG. 1 is a perspective view of an electrically powered ball valve assembly in accordance with the present invention;

FIG. 2 is a side elevational view in section on a larger scale of a portion of the assembly shown in FIG. 1;

FIG. 3 is a front elevational view on a larger scale of a portion of the assembly shown in FIG. 1;

FIG. 4 is an exploded perspective view of torque transfer means of the invention in accordance with the invention;

FIG. 5 is an elevational view of the torque transfer means in accordance with the invention in operative position between a drive unit output shaft and a ball stem illustrated in a state of misalignment;

FIG. 6 is a plan view on an enlarged scale of the torque transfer means of FIG. 5;

FIGS. 7 to 11 are plan views of the switch actuation means of the invention illustrated in various positions of rotation with respect to an electrical switch contacted by the actuation means to deenergize the power unit; and FIG. 12 is a schematic diagram of the control circuit employed in the electrically powered ball valve assembly in accordance with the invention.

Referring to the drawings, there is shown in FIG. 1 an electrically powered ball valve assembly 10 in accordance with the invention including an electrical power unit 12 mounted over a ball valve 14 and with a torque transfer means 16 connecting the power unit and the ball valve.

The ball valve includes a flow control ball 18 disposed between two valve seats 20 within a valve housing 22 having a valve bonnet or top plate 24. The flow control ball has a central bore 26 and an upper rotatable valve stem 28 extending upwardly through an opening in the bonnet for rotation of the ball. Appropriate stem seals, not shown, are provided in the bonnet to prevent fluid leakage at this point.

The electrical power unit 12 is secured in position over the ball valve by conventional mounting means 30 and includes a base 32, a gear train 34, a motor 36, a high start capacitor 38, a switch assembly 40, a drive unit housing 42 and an output shaft 44 extending downwardly through an opening provided in the base.

The capacitor 38 is connected to the motor to form a high starting capacitor motor of a high torque variety, the size of the motor being determined by the size of the particular ball valve to be operated. The electrical motor drives the gear train which in turn drives output shaft 44 which is connected to the ball stem.

The switch assembly 40, FIG. 2, includes an electrical single pole double throw snap switch 48 and in accordance with an important feature of the invention a switch actuation means or rotating cam 50 connected to an upper end of the output shaft by adjusting screw 52.

The snap switch 48, FIGS. 7–11 has first, second, and third snap switch contacts 54, 56 and 58 respectively and a pivotally mounted contact arm 64 electrically connected to the contact 58. A spring 60 is connected at one of its ends 62 to the contact arm or switch conductor 64 and is connected at its other end 66 to an operator or follower 68 shaped to engage the adjacent rotatably mounted cam 50 and to operate the switch for deenergizing the drive unit on movement of the cam to a predetermined point of quarter revolution. The spring cooperates with the follower and the contact arm continuously to bias the follower toward the cam so that when the cam moves away from the follower, the spring moves the follower outwardly causing the switch conductor to move in an opposite direction.

The switch actuation means or rotating cam 50 operates the switch, controlling the rotation of the output shaft. The cam is generally Z-shaped and includes a central longitudinally extending, generally rectangular bar or body portion having parallel sides 69, 70 and lobed ends 71, 72 having generally V-shaped arms or beaked portions 73, 74 extending laterally outwardly from the body portion on opposite sides of the body portion. In other words, the arms extend laterally in a counter-clockwise direction from their respective ends of the bar in relation to the cam's center of rotation.

The cam ends also have heel portions 75, 76 spaced from the beaked portions and intermediate curvilinear surfaces 77, 78 between the tip of the beaked portions and the heels. The surfaces 79 and 78 extend for substantially sixty degree arcs about the cam's center of rotation. The V-shaped beaked portions are defined respectively by the curvilinear surfaces and under surfaces 79, 80 positioned at a thirty degree angle from the curvilinear surfaces and also at a thirty degree angle from a radius drawn from the center of rotation to a tip of the beaks.

The operating circuit for the valve assembly is illustrated in FIG. 12 in conjunction with an external single pole double throw control switch 89 having a contact arm 81. A source of power 82 has one line 84 connected to the capacitor motor and a second line 86 connected to the control switch 89 used to control opening or closing movements of the valve. The control switch has one contact 88 connected to the first contact 54 of the snap switch; and has a second contact 90 connected to the second contact 56 of the snap switch. The third contact 58 of the snap switch which is in electrical contact with the contact arm 64 is connected to the capacitor motor to complete the operating circuit.

For purposes of an easier understanding of the invention, it is advantageous to provide at this time a functional description of the mode in which the components thus far identified operate. Specifically, consider the situation where the ball valve is in a fully open position with the switch assembly including the Z-shaped cam in the full line position illustrated in FIG. 7. In this position, one end of the cam is slightly separated from the free end 94 of the follower arm, that is, slightly clockwise with respect to the follower arm; and the contact arm 64 is in contacting position against the second snap switch contact 56. Assume that in this situation, the control switch contact arm 81 is in its first position against contact 88 with a resultant interrupted circuit to the capacitor-motor which drives the cam.

Where is is desired to close the ball valve, the control switch is moved with its contact arm into its second position against the contact 90 completing an electric circuit to the motor. The electric motor drives the gear train to turn the cam and the output shaft clockwise as viewed in FIGS. 7–11. The cam continues to move clockwise to the dotted line position shown in FIG. 7 where the heel at the other end of the cam approaches the cam follower. The cam heel bears against the follower arm to overcome the spring tension; and when the cam has rotated exactly 90 degrees to the position shown in FIG. 8 with the heel of the cam pushing against the cam follower, the contact arm 64 snaps to the right, as viewed in FIGS. 7–11, into position against contact 54 breaking the circuit to the motor and a motor brake conventionally provided helps to stop the motor, gear train, cam and output shaft instantaneously with the ball in a fully closed position preventing a flow of fluids through the valve.

In this open circuit position illustrated in FIG. 8, the distance between the cam heel, in position against the follower, and the free end 94 of the cam follower defines a chord of a 30 degree arc with respect to the center of rotation of the cam. In other words, the cam must move through an arc of 90 degrees total, since the curvilinear cam surface comprises a 60 degree arc, before the cam moves clockwise away from the follower arm.

Now, consider that it is desired to open the ball valve. In this case, the control switch is thrown back to its first position with its contact arm 81 in position against contact 88 permitting a flow of electric current to the electric motor and driving the cam clockwise and biasing the cam follower arm to the left as shown in FIG. 9. Immediately prior to completion of a quarter revolution, the cam is in the full line position illustrated in FIG. 9.

The switch spring 60 cooperates with the follower arm and contact arm to bias the follower toward the cam so that when the cam moves away from the follower arm, as illustrated in FIG. 10 showing the cam at the instant of drop-off or movement out of contact with the follower arm, the spring moves the follower arm outwardly from the dotted line position to the full line position illustrated in FIG. 10; and the contact arm 64 springs to the left into contacting position against the second contact 56. This movement breaks the circuit to the electric motor and the valve ball stops instantly.

The extreme importance of the sharp break-off or drop-off point provided by the cam with respect to the follower arm is best seen in FIG. 11 in which the clearance between the free end of the follower arm and the under surface of the beaked portion of the cam is readily seen. While the cam is positioned so as to operate only in a clockwise direction, residual torque on the output shaft immediately after the cam moves out of contact with the follower arm tends to cause a springback of the cam, as indicated by the counter-clockwise arrow in FIG. 11, from the dotted line to the full line position of FIG. 11. As should be clear, if it were not for this clearance between the end of the follower arm and the beak under surface, problems could easily arise. For instance, the cam in its springback movement would tend to strike the end of the follower arm, bending it or pushing it back into a position as illustrated in FIG. 9 causing a temporary reactivation of the electric motor and consequent excessive rotation of the ball. Instead of this, the acute angle defined by the beaked portions of the cam provides a sharp break-off point where the follower arm can move instantaneously to the right deactivating the motor after precisely a ninety degree arc of rotation of the cam; and without difficulties occasioned by cam springback.

As should be clear, to adjust the position at which rotation of the valve ball terminates, it is only necessary to loosen the cam adjusting screw 52 and to reposition the cam on the output shaft.

In accordance with another important feature of the invention, the torque transfer means 16 connecting the power unit output shaft and the ball stem comprises a pair of identical complementary half couplings, designated generally by the numerals 96, 97 respectively in FIG. 4, and adapted to engage each other and to transfer torque from the output shaft to the valve stem. For purposes of description, the lower half coupling in FIG. 4 should be considered, although numerical reference is also made to the upper half coupling. The half couples are generally L-shaped in cross-section and each include flat rectangular body portions 98, 99, having first end portions 100, 101 respectively merging with arm or drive prongs 102, 103 positioned generally perpendicular to the body portions. Opposite ends of the body portions merge with tail portions 104, 105 extending longitudinally outwardly from the body portions. The body portions respectively have generally rectangular openings 113 and 115 therein adapted to receive complementary rectangular ends of the output shaft and the valve stem.

The tail portions 104 and 105 each have rear flat faces 106, 107 which are generally perpendicular to the flat body portions. The flat rear faces 106, 107 are in the same plane as the flat front faces 108, 109 of the drive prongs. The flat front faces of the drive prongs and the flat rear faces of the tail portions are thus parallel and on a common center line of the rectangular openings in the body portions to provide surfaces adapted to mate with each other. Thus the drive prongs of the half couplings are adapted to engage the rear faces of the tail of the opposite half coupling.

The operation of the half couplings should be clear from the above description, however, for purposes of a better understanding thereof, a functional description of the mode in which they operate will be given. The manner in which the couplings fit about the output shaft and the valve stem is best seen in FIG. 3. The lower half coupling 97 is fitted in position about the upper end of the valve stem with the drive prong extending upwardly and secured in place by appropriate locking means, a nut being shown for this purpose in FIG. 3. The upper half coupling 96 is positioned on the lower end of the output shaft and secured in position by suitable locking means with the drive prong extending downwardly and in position against the flat rear surface of the tail of the lower half coupling. Thus, the upper half coupling has its tail rear surface and its drive prong in driving position against matching surfaces of the lower half coupling. Upon actuation of the motor, the output shaft rotates clockwise turning the upper half coupling 96 which drives the lower half coupling 97 transmitting torque from the output shaft to the ball stem and turning the ball 90 degrees in its seat. The unique configuration of the half couplings results in a universal type of drive eliminating any difficulty due to lack of precision in exact alignment of the output shaft with respect to the ball stem. This is illustrated in FIGS. 5 and 6 showing the output shaft out of alignment with respect to the ball stem. Despite the angularity existing between the output shaft and the ball stem, the mating surfaces of the half couplings are maintained in contacting position with the result that the ball rotates precisely 90 degrees for each ninety degree turn of the output shaft.

The particular configuration of the torque transfer means of the ball valve assembly is especially advantageous in permitting manual movement of the ball. In the event of power failure, it is a simple matter to insert a hand tool such as a wrench or a screw driver between the two half couplings, FIG. 3, and to rotate the lower or ball stem half coupling clockwise until the ball is in the position desired. As should be appreciated, when the electric current is available, the unit actuates the output shaft to exactly the position dictated by the control switch prior to the power failure. For instance, consider a movement of the control switch to a position for rotation of the ball to a valve open position. In the event of power failure at this point, it is a simple matter to manually rotate the ball stem and ball by insertion and rotation of a screw driver between the two half couplings. At such time as current again became available, the flow of current would energize the motor rotating the output shaft and its half coupling and driving the lower half coupling stem, and ball into exactly the position desired that is, into the completely open position.

While a preferred embodiment of the invention has been shown and described, it is apparent that many structural details may be changed without departing from the spirit and scope of the appended claims.

The invention is claimed as follows:

1. In an electrically powered ball valve assembly including a ball valve and an electrically powered drive unit to open and close said ball valve, said ball valve having a rotatable centrally bored ball having a rotatable stem connected thereto for rotation of said ball within a housing; said drive unit being secured to said ball valve, said drive unit including a base and having a rotary output shaft extending through said base, said shaft having an upper end and a lower end; means connecting the lower end of said output shaft to said rotatable ball stem for rotation of said ball to open and close said ball valve; and electrical switch means secured to said base adjacent the upper end of said output shaft, said switch means including an operator arm shaped to serve as a cam follower to operate the switch to deenergize the drive unit, the improvement comprising: a rotatable cam secured to the upper end of said output shaft for rotation with said output shaft and positioned in coacting relation to said operator arm to operate said switch means, said cam having first and second curvilinear ends, said ends each including an oppositely positioned beaked portion extending laterally from its respective cam end in one direction with respect to a longitudinal center point between said ends, said ends having a 60 degree curvilinear surface adapted to engage said switch operator arm and hold it in a first position in which an electric circuit to energize said drive unit is maintained for precisely a 90 degree arc of rotation of said cam, said cam beak having a sharp operator arm drop-off surface whereby said operator arm springs instantaneously outwardly when said cam beak moves out of engagement with said operator arm for an instantaneous deenergization of said drive unit to stop said valve ball in a fully opened or closed position.

2. In an electrically powered ball valve assembly including a ball valve and an electrically powered drive unit to open and close said ball valve, said ball valve having a rotatable centrally bored ball within a ball housing, said ball having a rotatable stem extending upwardly through said valve housing for rotation of said ball within said housing; said electrically powered drive unit including a base mounted over said valve housing; a high starting capacitor motor of a high torque variety secured to said base, a rotary output shaft driven by said electrical motor in one direction, said output shaft extending downwardly through an opening in said base, said shaft having an upper end and a lower end, said lower end being connected to said rotatable ball stem for rotation of said ball within said housing; an electrical control switch secured to said base adjacent the upper end of said output shaft, said snap switch including a switch conductor to move between and make contact alternatively with a first or second contact, said snap switch including an operator arm and a spring connected at one end to said switch conductor and connected at its other end to said operator arm, said operator arm shaped to serve as a cam follower to operate the switch conductor between said first and second contacts to deenergize the drive unit on movement of said switch conductor alternatively to said first and second contact, the improvement comprising: a rotatable Z-shaped cam connected to the upper end of said output shaft for rotation in the same direction as said output shaft to operate said switch, said cam having a generally rectangular body with oppositely disposed curvilinear ends said ends each including a beaked portion extending laterally from said cam end in a direction opposite to the direction of movement of said cam end said cam ends including a heel portion on the opposite side of said cam ends from said beaked portion to engage said operator arm to operate said switch upon revolution of said cam through 90 degrees out of engagement with said operator arm, the curvilinear surface of said ends being adapted to engage said switch operator arm and hold it in an electrical circuit completing position for precisely a 90 degree revolution of said cam, said cam beak defining an acute angle to provide a sharp operator arm drop-off surface whereby said switch operator arm springs instantaneously outwardly when said cam beak moves out of engagement with said operator arm for an instantaneous interruption of said electrical circuit to stop said valve ball in a predetermined position upon completion of said 90 degree revolution of said cam, said acute angle of said beak providing a clearance between said cam and said operator arm to avoid re-energization of the drive unit in the event of spring back of said output shaft and the cam.

3. An electrically powered ball valve assembly comprising a ball valve and an electrically powered geared drive unit mounted in coacting relation to said valve to open and close said ball valve, said ball valve having a rotatable centrally bored ball within a ball housing, said ball having a rotatable stem connected therto and extending upwardly through said valve housing for rotation of said ball within said housing; said electrically powered geared drive unit including a base, said base being mounted on said valve housing in spaced relation thereto, an electrical capacitor motor of high torque variety secured to said base, a rotary output shaft driven by said electrical motor in only one direction, said output shaft extending downwardly through an opening in said base, said shaft having an upper end and a lower end, said lower end being connected to said rotatable ball stem for rotation of said ball within said housing, an electrical single pole double throw snap switch secured to said base in a position adjacent the upper end of said output shaft, said snap switch including a switch conductor to move between and make contact alternatively with a first or second contact in a first and second electrical circuit completed by an external control switch said snap switch including an operator arm and a spring connected at one end to said switch conductor and connected at its other end to said operator arm, said operator arm being shaped to serve as a cam follower to operate the switch conductor between said first and second contacts to deenergize the drive unit on movement of said switch conductor alternatively into position against said first and second contacts; and a rotatable Z-shaped cam connected to the upper end of said output shaft in coacting relation to said snap switch for rotation with said output shaft in the same direction as said shaft to operate said snap switch, said cam having a generally rectangular body portion with oppositely disposed curvilinear ends, said ends each having a generally rectangular body portion with oppositely disposed curvilinear ends, said ends each including a beaked portion, said beaked portion of said ends extending laterally from said cam end in a counter clockwise direction with respect to a longitudinal center point of said rectangular body portion comprising a center of rotation of said cam, said cam ends including a heel portion on the opposite side of said cam ends from said beaked portion, said cam being positioned on said output shaft to rotate in a heel-first clockwise direction, said ends having a 60 degree curvilinear surface between a tip of said beaked portion and the side of said cam adjacent said heel portion, said surface being adapted to engage said switch operator arm and hold it in position to overcome the spring tension of said switch to maintain the operator arm in position against said first contact for precisely a 90 degree rotation of said cam, said cam beak defining a 30 degree angle or an acute angle to provide a sharp drop-off surface for said operator arm whereby said switch operator arm springs instantaneously outwardly from said first contact into position against said second contact when said cam beak moves out of engagement with said operator arm for immediate deenergization of said drive unit to stop said valve ball in a predetermined position.

4. An electrically powered ball valve assembly comprising a ball valve and an electrically powered drive unit to open and close said ball valve, said ball valve having a rotatable centrally bored ball within a ball housing, said ball having a rotatable stem connected thereto and extending through said valve housing for rotation of said ball within said housing; said electrically powered drive unit including a base, said base being mounted on said valve housing, a rotary output shaft extending downwardly through said base, said shaft having a lower end connected to said rotatable ball stem for rotation of said ball within said housing, an electrical single pole double throw snap switch secured to said base in a position adjacent the upper end of said output shaft, said snap switch including a switch conductor to move between and make contact alternatively with a first or second contact, said snap switch including an operator arm and a spring connected at one end to said switch conductor and connected at its other end to said operator arm, said operator arm shaped to serve as a cam follower to operate the switch conductor between said first and second contacts to deenergize the drive unit on movement of said switch conductor alternatively to said first and second contacts; and a rotatable Z-shaped cam mounted on the upper end of said output shaft for rotation with said output shaft to operate said switch, said cam being shaped and positioned in relation to said switch to deenergize said drive unit instantaneously upon completion of each successive 90 degrees revolution of said cam, said cam having curvilinear ends each including a breaked portion extending laterally from said cam end in a direction opposite to the direction of rotation of said end, said cam ends including a heel portion on the opposite side of said cam ends from said beaked portion, said ends having a curvilinear surface adapted to engage said switch operator arm and hold it in drive unit energizing position for precisely a 90 degree revolution of said cam, said cam beak defining an acute angle to prevent reenergization of said drive unit or injury to said operator arm in the event of rotational spring back of said operator arm to move said cam in a counter-clockwise direction; and means for adjusting the position of said cam with respect to said output shaft for a complete opening and closing of said ball valve upon deenergization of said drive unit.

5. An assembly for turning a rotatable stem of a unit such as a valve to be controlled comprising drive means having a rotatable output member in general alignment with said stem, coupling means connecting said member and said stem and including complementary parts each presenting first and second generally axially extending and radially extending drive surfaces, the axially extending surface of one part engaging the radially extending surface of the other part, the radially extending surfaces of said parts being axially spaced from each other, the engagement of said parts accommodating axial misalignment between said stem and said output member, power means for actuating said drive means, and means controlling said power means including a rotatable cam presenting a control surface and connected to and driven by said drive means and a control element engaging and actuated by said cam surface, said cam surface having a terminal end for releasing said control element, and said cam being relieved at said cam surface end for insuring rapid and complete disengagement of said control element from said cam surface.

6. In an assembly for turning a rotatable stem of a unit such as a valve to be controlled, the combination comprising drive means having a rotatable output member in general alignment with said stem, coupling means connecting said member and said stem, power means for actuating said drive means, and means controlling said power means including a rotatable cam presenting a control surface and connected to and driven by said drive means and a control element actuated by said cam surface, said cam surface having a terminal end for releasing said control element, and said cam means being relieved at said cam surface end for insuring rapid and complete disengagement of said control element from said cam surface.

7. An assembly comprising: a valve having a flow control member which is rotatable in one direction to sequentially open and close the valve; a drive means connected to the flow control member to rotate the flow control member in the one direction; a first switch connected to said drive means, said first switch being actuatable to energize said drive means and rotate the flow control member in the one direction to open and close said valve; a second switch connected to said drive means, said second switch being actuatable to deenergize said drive means and halt the rotation of said flow control member in the one direction; and a cam connected to said drive means for rotation contemporaneously with the rotation of the flow control member to actuate said second switch and deenergize said drive means when the flow control member has been rotated for a sufficient distance in the one direction to open said valve, said second switch also being actuated by said cam to deenergize said drive means when the flow control member has been rotated for a sufficient distance in the one direction to close said valve.

8. An assembly as set forth in claim 7 wherein: said second switch includes first and second fixed contacts mounted in a spaced apart relationship on a frame means, a switch arm pivotally mounted on said frame means for movement from a first position engaging said first fixed contact to a second positon engaging said second fixed contact, an actuator arm mounted on said frame, and a spring means interconnecting said actuator arm and said switch arm to resiliently bias said switch arm toward the first position and said actuator arm outwardly toward said cam, said cam being rotated into engagement with said actuator arm to snap said switch arm from the first position to said second position to actuate said second switch to deenergize said drive means, said drive means being subsequently reenergized to continue the rotation of said cam in the same direction to move said cam out of engagement with said switch arm to snap said switch arm from said second position to said first position under the influence of said spring means to again actuate said second switch to deenergize said drive means.

9. An assembly as set forth in claim 7 wherein: said flow control member is rotated by said drive means in the one direction for a first predetermined arcuate distance to open said valve when said valve is closed and said flow control member is rotated in the one direction for a second predetermined arcuate distance to close said valve when said valve is open, said cam being rotated contemporaneously with said flow control member for an arcuate distance equal to said first predetermined arcuate distance to actuate said second switch to deenergize said drive means when said valve is opened and said cam being rotated contemporaneously with said flow control member for an arcuate distance equal to said second predetermined arcuate distance to actuate said second switch when said valve is closed.

10. An assembly as set forth in claim 9 wherein: said first and second predetermined arcuate distances are both equal to ninety degrees.

11. An assembly as set forth in claim 9 wherein: said cam is successively rotated into and out of engagement with said second switch to actuate said second switch.

12. An assembly as set forth in claim 7 wherein: said drive means is connected to said flow control member by a torque transfer assembly including a first L-shaped coupling connected to said drive means and a second L-shaped coupling connected to said flow control member, said first coupling having an outwardly extending tail portion with a flat drive face and a drive prong extending toward the flow control member, said drive prong having a flat drive face, said second coupling having an outwardly extending tail portion with a flat drive face positioned in abutting driving engagement with the flat drive face of the drive prong of said first coupling when the flow control member is being rotated in the one direction by said drive means, and said second coupling also having a drive prong extending toward said drive means with a flat drive face positioned in abutting driving engagement with the flat drive face of the tail portion of said first coupling when the flow control member is being rotated in the one direction by said drive means.

13. An assembly as set forth in claim 7 wherein: said cam includes a body member having first and second arcuate cam surfaces located on opposite ends of said body member, said drive means being energized a plurality of times by actuating said first switch a plurality of times to rotate said body member in a series of arcuate steps, said body member being rotated a first step to move said first cam surface into engagement with said second switch to actuate said second switch a first time, said body member being rotated a second step to move said first cam surface out of engagement with said second switch to actuate said second switch a second time, said body member being rotated a third step to move said second cam surface into engagement with said second switch to actuate said second switch a third time, and said body member being rotated a fourth step to move said second cam surface out of engagement with said second switch to actuate said second switch a fourth time, said drive means being deenergized each time said second switch is actuated and said drive means being reenergized by the actuating of said first switch, and said flow control member being rotated in the one direction to open and close said valve as the body member is rotated in the series of arcuate steps.

References Cited

UNITED STATES PATENTS

| | | | |
|---|---|---|---|
| 181,972 | 9/1876 | Packer | 64—10 |
| 1,693,273 | 11/1928 | Hankison | 251—131 X |
| 1,895,880 | 1/1933 | Cummings | 251—133 X |
| 2,127,680 | 8/1938 | Edmondson | 251—131 X |
| 2,150,117 | 3/1939 | Griffith | 251—131 X |
| 2,544,448 | 3/1951 | Downey | 251—131 X |
| 2,621,678 | 12/1952 | Snyder et al. | 251—133 X |
| 2,662,547 | 12/1953 | Comeau | 251—131 X |
| 3,045,693 | 7/1962 | Allen | 251—315 X |
| 3,120,589 | 2/1964 | Westberg | 200—61.86 |
| 3,163,724 | 12/1964 | Roeser | 200—153.13 X |

M. CARY NELSON, *Primary Examiner.*

R. C. MILLER, *Assistant Examiner.*